No. 659,189. Patented Oct. 2, 1900.
W. WEINER.
SPRING MOTOR VEHICLE.
(Application filed Jan. 24, 1900.)
(No Model.) 2 Sheets—Sheet 1.
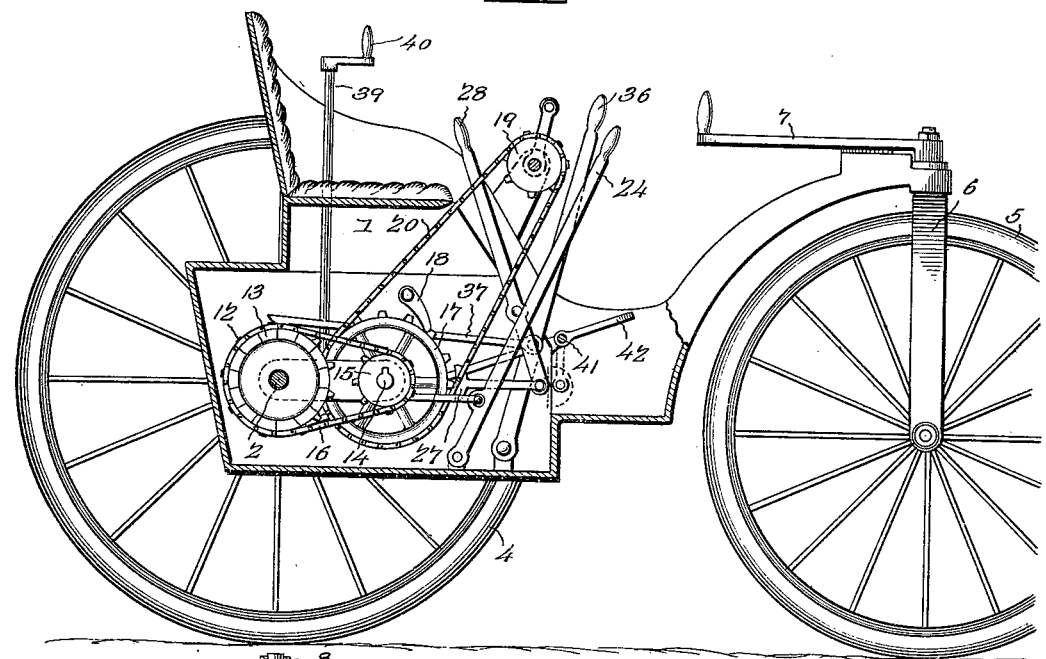
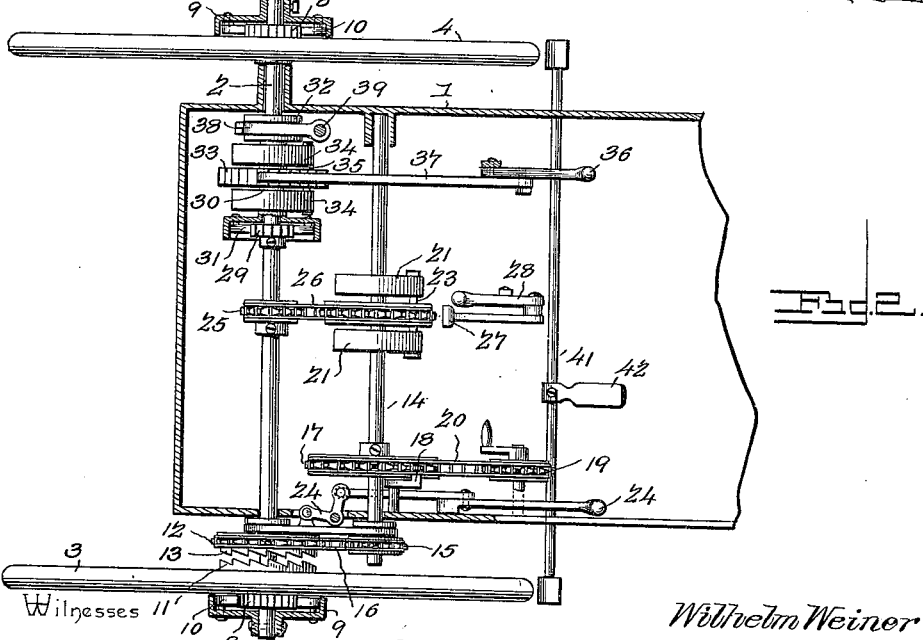
Witnesses
E. L. Stewart
J. W. Garner
Wilhelm Weiner, Inventor
By his Attorneys
C. A. Snow & Co.
THE NORRIS PETERS CO., PHOTO-LITHO., WASHINGTON, D. C.

No. 659,189. Patented Oct. 2, 1900.
W. WEINER.
SPRING MOTOR VEHICLE.
(Application filed Jan. 24, 1900.)
(No Model.) 2 Sheets—Sheet 2.
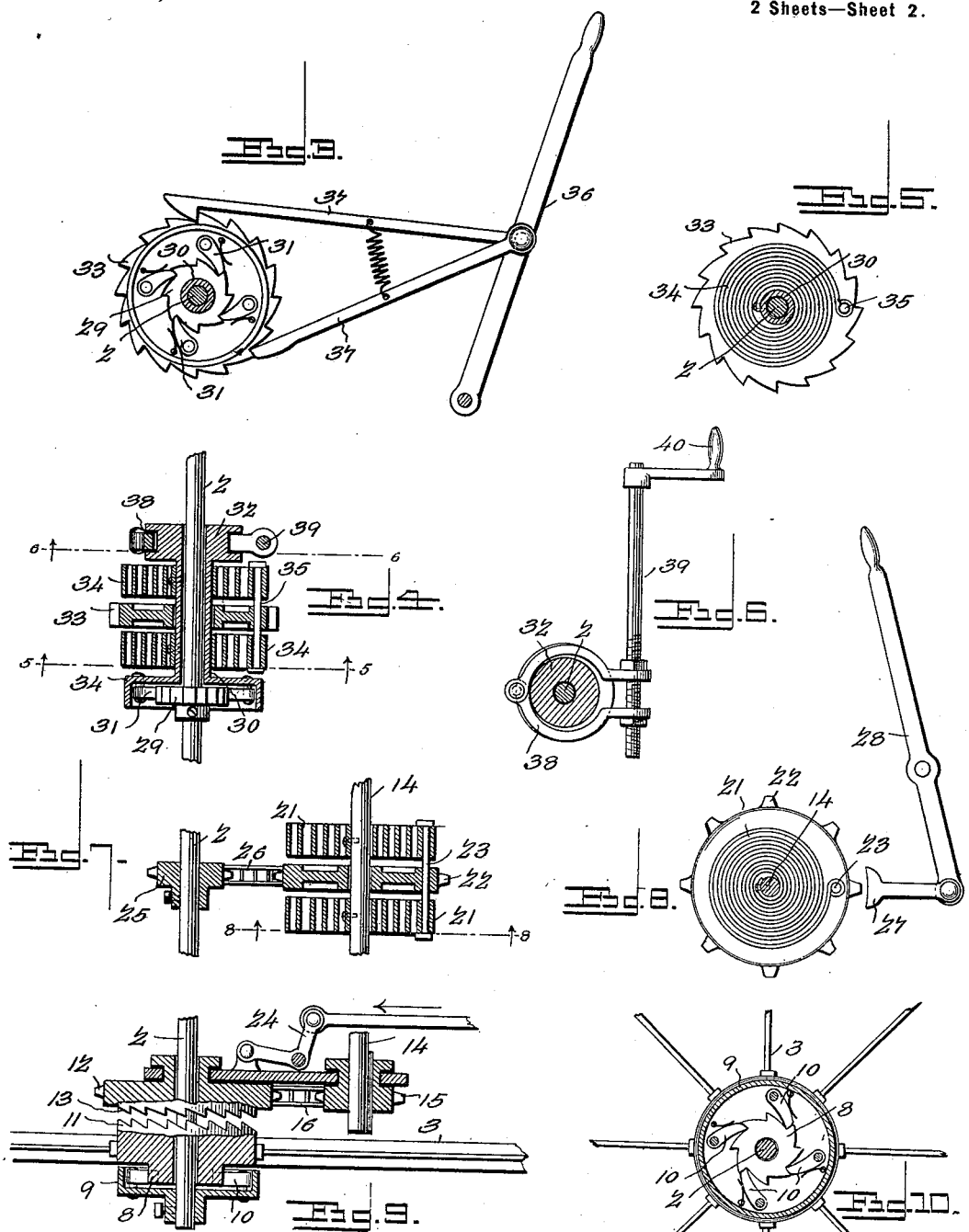

UNITED STATES PATENT OFFICE.

WILHELM WEINER, OF WYMORE, NEBRASKA, ASSIGNOR OF ONE-HALF TO HENRY SCHMITZ, OF SAME PLACE.

SPRING-MOTOR VEHICLE.

SPECIFICATION forming part of Letters Patent No. 659,189, dated October 2, 1900.

Application filed January 24, 1900. Serial No. 2,672. (No model.)

*To all whom it may concern:*

Be it known that I, WILHELM WEINER, a citizen of the United States, residing at Wymore, in the county of Gage and State of Nebraska, have invented a new and useful Spring-Motor Vehicle, of which the following is a specification.

My invention is an improved spring-motor vehicle, the objects of my invention being to provide a primary spring-motor mechanism and a secondary spring-motor mechanism, devices for connecting them independently of each other to the traction-wheels of the vehicle and for disconnecting them therefrom, and independent manually-operated means for winding said primary and secondary spring-motor mechanisms, whereby said primary and secondary spring-motor mechanisms may be employed either singly or both in unison to propel the vehicle, hence adapting the latter for the storage of primary and secondary or reserve power when descending an incline, and for the employment of such primary and secondary mechanisms for the purposes of propulsion, either singly or in unison, as the same may be required by the varying conditions of speed, load, or grade.

With these objects in view my invention consists in the combination of a traction-wheel loose on its shaft and connected thereto by pawl-and-ratchet mechanism or equivalent devices, a clutch loose on said shaft and adapted to engage and rotate with said traction-wheel, a spring-shaft, connections between the revoluble clutch and said spring-shaft to communicate rotary motion from the traction-wheel to said spring-shaft, pawl-and-ratchet mechanism for the latter to prevent retrograde rotation thereof, a spring-wheel connected to the spring or springs on the spring-shaft and adapted to be rotated by the reaction of said spring or springs, a detent for said spring-wheel, and connections between the latter and the shaft of the traction-wheel.

My invention further consists in the combination of a traction-wheel loose on its shaft and connected thereto by pawl-and-ratchet mechanism or equivalent devices, a sleeve loose on said shaft and connected thereto by pawl-and-ratchet mechanism or equivalent devices, a detent to lock said sleeve against rotation, a spring or springs having one end fast to said sleeve, a loose wheel on said sleeve and to which the outer end or ends of said spring or springs is or are connected, and a device to permit or prevent rotation of said wheel.

My invention further consists in the peculiar construction and combination of devices, hereinafter fully set forth, and particularly pointed out in the claims.

In the accompanying drawings, Figure 1 is a side elevation of a spring-motor vehicle embodying my improvements. Fig. 2 is a top plan view of the running-gear thereof and illustrating my improved primary and secondary spring-motor mechanisms in operative position. Fig. 3 is a detail sectional view of the winding mechanism of the secondary motor. Fig. 4 is a detail horizontal sectional view of the secondary motor. Figs. 5 and 6 are detail sections of the secondary spring-motor mechanism, taken on the lines 5 5 and 6 6, respectively, of Fig. 4. Fig. 7 is a detail sectional view of the primary spring-motor and its connections with the axle-shaft. Fig. 8 is a detail elevation of the primary spring-motor and the detent-lever for controlling the same. Fig. 9 is a detail sectional view of the traction-wheel, the clutch therefor, and connections between the axle-shaft and the primary-spring-motor shaft. Fig. 10 is a detail sectional view showing the pawl-and-ratchet connections between the traction-wheel and the axle-shaft.

The body 1 of my improved spring-motor vehicle may be of any suitable preferred construction and is supported at its rear upon a shaft or axle 2, on which are loosely mounted a traction-wheel 3 and a supporting-wheel 4, which are both of the same size and diameter.

The front end of my improved vehicle is provided with a guide and supporting wheel 5, which is mounted in a tiller-fork 6, pivoted in the front end of the vehicle-body and provided with a tiller or handle 7, of suitable construction, and, if desired, also with devices for locking the tiller in any position.

The wheels 3 4 are provided on their outer sides with ratchet-wheels 8, that constitute extensions of the hubs of said wheels, and circular boxes 9, resembling hubs in appearance, are keyed to the shaft or axle 2 or secured thereto by bolts, as may be preferred, so as to cause said boxes to rotate with said shaft, and in the said boxes are pivoted pawls 10, which engage the said ratchet-wheel, and thereby lock said wheels 3 and 4 to said axle or shaft when the vehicle is advancing, while permitting said wheels to rotate idly on said shaft in the reverse direction and permitting said shaft to rotate idly in said wheels in said reverse direction. By this arrangement power may be applied from the traction-wheel to said shaft or axle or from the latter to the former, and the wheels 3 and 4 are permitted to slip on said shaft or axle to adapt the vehicle for turning curves. On the inner side of the traction-wheel 3 is a clutch-member 11, which is fast therewith. A sprocket-wheel 12 is loose on the shaft or axle 2 and adapted to slip laterally thereon and is provided on the side next the traction-wheel 3 with a clutch member 13, which is adapted to engage the clutch member 11 on the traction-wheel, and thereby lock the sprocket-wheel to the traction-wheel.

A primary-spring-motor power-shaft 14 is journaled in suitable bearings and supported at a suitable distance in advance of the axle-shaft 2. A sprocket-wheel 15, which is of considerably-less diameter than the sprocket-wheel 12, is connected to the latter by an endless sprocket-chain 16. A sprocket-wheel 17 is fast on the shaft 14 and is engaged by a detent 18, whereby said shaft 14 is secured against retrograde rotation while permitted to rotate in one direction, and said wheel 17 is connected to a cranked sprocket-wheel 19 by an endless sprocket-chain 20. Said cranked sprocket-wheel 19 is adapted to be rotated manually and is journaled on a suitable support in the body of the vehicle, and it will be understood that by manually rotating said cranked wheel 19 the shaft 14 may be rotated in one direction and caused to wind up a pair of motor-springs 21, which have their inner ends connected to said shaft and their outer ends connected to a sprocket-wheel 22, as at 23, the said sprocket-wheel 22 being loose on said shaft 14. The sprocket-wheel 15 is splined on the shaft 14, and thereby adapted to rotate therewith and move laterally thereon, and a suitable lever and connections 24 are provided for shifting the connected sprocket-wheels 12 15 in unison on their respective shafts to cause the sprocket-wheel 12 to be clutched to or unclutched from the traction-wheel 3.

A sprocket-wheel 25, which is of considerably less diameter than the wheel 22, is fast on the axle-shaft 2 and is connected to said wheel 22 by an endless sprocket-chain 26. A detent 27 is adapted to engage the wheel 22 to lock the same, and hence to also lock the axle-shaft against rotation. Said detent is operated by a lever 28, to which it is connected.

The mechanism hereinbefore described on the shaft 14 constitutes the primary spring-motor, the operation of which is as follows: To wind the primary motor manually, lock the wheel 22 by the detent 27 and turn the cranked sprocket-wheel 19, and the wheel 12 having been previously unclutched from the traction-wheel the chain 20 and wheel 17 will convey rotary motion from the wheel 19 to the shaft 14, thereby causing the latter to wind up the coil-springs 21. To employ the power of the spring-motor for purposes of propulsion, clutch the wheel 19 to the traction-wheel and disengage the detent 27 from the spring-actuated sprocket-wheel 22. The primary-motor shaft 14 being held by the detent 18 on the wheel 17 against retrograde rotation, the reaction of the coiled springs 21 on the wheel 22 will rotate the latter and its power will be communicated to the axle-shaft 2 through the chain 26 and wheel 25, causing said axle-shaft to rotate, thereby engaging the pawls with the ratchet-hubs of the traction-wheel, and hence causing the latter to rotate and propel the vehicle ahead, as will be readily understood. When descending a grade, the spring-actuated wheel 22 should be locked against rotation by the detent 27, while retaining the wheel 12 in clutched engagement with the traction-wheel 3. The vehicle in descending by gravity will turn the wheel 3 on the axle-shaft 2, the latter being locked against rotation by the detent 27, as above, and hence rotary motion will be communicated from the traction-wheel to the shaft 14 through the connections 12 15 16, and hence cause said shaft 14 to coil or wind up the springs 21, and thereby store up power which may thereafter be employed for purposes of propulsion, as hereinbefore described.

I will now describe my secondary spring-motor mechanism for storing and applying power.

Fast on the axle-shaft 2 is a ratchet-wheel 29. A tubular shaft 30 is loose on the axle-shaft and carries a pair or more of pawls 31, which engage the ratchet-wheel 29, thereby adapting the axle-shaft to rotate when the vehicle is being propelled ahead without rotating said tubular shaft. The latter is provided at the end opposite the ratchet-wheel with a friction-wheel 32. A ratchet-wheel 33 is loose on the tubular shaft, and a pair of coiled springs 34 have their inner ends secured to said tubular shaft and their outer ends connected to the wheel 33, as at 35. A manually-operated lever 36, which is pivoted on a suitable support, is provided with a pair of pawl-rods 37, which engage opposite sides of the ratchet-wheel 33 alternately when said lever 36 is operated, and hence cause said wheel 33 to rotate and wind up said springs 34. A friction-band 38 on the periphery of the friction-wheel 32 has its ends engaged by right and left hand threaded portions on a screwed shaft 39, which is supported in suitable bearings and is provided with a crank 40, by means of which it may be turned so as to compress the friction-band on the friction-wheel, and thereby lock the hollow shaft against rotation. By turning the said shaft 39 in the reverse direction said friction-band will release the friction-wheel, and hence permit the latter to rotate by the uncoiling of the springs 34, with the result that the pawls 31 will become engaged with the ratchet-wheel 29 on the axle-shaft, and hence rotate the latter. Assuming that when said axle-shaft is thus rotated by the reaction of the springs 34 the springs 21 are practically run down, the detent 27 disengaged from the wheel 22, and the wheel 12 clutched to the traction-wheel 3, the rotary motion of the shaft 2 will be communicated to the shaft 14 through the wheel 25, chain 26, wheel 22, and springs 21, and the rotary motion of the shaft 14 will be communicated to the traction-wheel 3 through the wheels 15 and 12 and the chain 16 and clutch, as will be readily understood.

From the foregoing it will be apparent that the reserve energy in the secondary motor may be applied to the propulsion of the vehicle either after the energy of the primary motor has been expended or while said primary motor is contributing to the propulsion of the vehicle. Hence the propelling power of my improved vehicle may be increased or diminished according to the varying requirements as to speed, load, and grade.

A suitable brake apparatus 41 may be employed in connection with my improved spring-motor vehicle operated by a foot-lever 42.

I do not desire to limit myself to the precise construction and arrangement of devices hereinbefore described, as it is evident that modifications may be made therein without departing from the spirit of my invention. For example, the detent 27 and wheel 22 and friction-wheel 32, with its screw-shaft and friction-band, are but different species of detents for controlling the spring mechanism, and the two manually-operable winding mechanisms hereinbefore shown and described are but different species of devices for manually winding the springs.

Having thus described my invention, I claim—

1. The combination, in a spring-motor vehicle, of a traction-wheel loose on its shaft, and connected thereto by pawl-and-ratchet mechanisms (or equivalent devices), a clutch, loose on said shaft, and adapted to engage and rotate with said traction-wheel, a spring-motor, a shaft for winding the spring thereof, connections between the revoluble clutch and said shaft to communicate rotary motion from the traction-wheel to said shaft, pawl-and-ratchet mechanism for the latter, to prevent retrograde rotation thereof, a spring-actuated wheel connected to the springs, (one or more) on the winding-shaft, and adapted to be rotated by the reaction of said spring, a detent for said spring-actuated wheel, and connections between the latter and the shaft of the traction-wheel, substantially as described.

2. The combination, in a spring-motor vehicle, of a traction-wheel, loose on its shaft and connected thereto by pawl-and-ratchet mechanisms (or equivalent devices), a sleeve or tubular shaft loose on said shaft, and connected thereto by pawl-and-ratchet mechanisms (or equivalent devices), springs (one or more), having one end fast to said tubular shaft, a loose winding-wheel on said sleeve, and to which the outer ends of said springs are connected, and a device to permit or prevent rotation of said winding-wheel, substantially as described.

3. The combination, in a spring-motor vehicle, of an axle-shaft, a traction-wheel loose thereon, pawl-and-ratchet connections between said wheel and shaft, a clutch loose on said shaft, to engage and rotate with said traction-wheel, a spring-shaft, connections between the revoluble clutch and said spring-shaft, to communicate rotary motion from the traction-wheel to said spring-shaft, pawl-and-ratchet mechanism to prevent retrograde rotation of said spring-shaft, a spring-actuated wheel on said spring-shaft, a detent for said spring-wheel, and connections between the latter and the axle-shaft; with the tubular shaft on said axle-shaft, and connected thereto by pawl-and-ratchet mechanism, a detent to lock said tubular shaft against rotation, springs, (one or more) fast at one end to said tubular shaft, a wheel loose on said tubular shaft and to which said springs are attached, and means to rotate or lock said spring-wheel, all arranged and combined to operate, substantially as described.

In testimony that I claim the foregoing as my own I have hereto affixed my signature in the presence of two witnesses.

WILHELM WEINER.

Witnesses:
F. W. MOHRBACHER,
I. E. CAMERON.